US010097818B1

(12) United States Patent
Spinner et al.

(10) Patent No.: US 10,097,818 B1
(45) Date of Patent: Oct. 9, 2018

(54) VIDEO PROCESSOR WITH DIGITAL VIDEO SIGNAL PROCESSING CAPABILITIES

(71) Applicants: Advanced Testing Technologies, Inc., Hauppauge, NY (US); Eli Levi, Dix Hills, NY (US)

(72) Inventors: Robert Spinner, East Northport, NY (US); Eli Levi, Dix Hills, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 0 days.

(21) Appl. No.: 15/837,742

(22) Filed: Dec. 11, 2017

Related U.S. Application Data

(60) Provisional application No. 62/439,188, filed on Dec. 27, 2016.

(51) Int. Cl.
| | |
|---|---|
| *H04N 17/02* | (2006.01) |
| *H04N 5/46* | (2006.01) |
| *H04N 9/64* | (2006.01) |
| *H04N 17/00* | (2006.01) |
| *H04N 21/2343* | (2011.01) |

(52) U.S. Cl.
CPC ........... *H04N 17/004* (2013.01); *H04N 17/02* (2013.01); *H04N 21/2343* (2013.01)

(58) Field of Classification Search
CPC ...... H04N 17/004; H04N 17/02; H04N 17/00; H04N 17/04; H04N 17/002; H04N 17/045;

(Continued)

(56) References Cited

U.S. PATENT DOCUMENTS

| 6,028,904 A | 2/2000 | Yanagisawa et al. |
| 6,396,536 B1 | 5/2002 | Howell et al. |

(Continued)

FOREIGN PATENT DOCUMENTS

| CN | 101720008 A | 6/2010 |
| CN | 105403381 A | 3/2016 |
| CN | 205246317 U | 5/2016 |

OTHER PUBLICATIONS

Abstract of CN 105403381.
Abstract of CN 101720008.
Abstract of CN 205246317.

*Primary Examiner* — Sherrie Hsia
(74) *Attorney, Agent, or Firm* — Brian Roffe

(57) ABSTRACT

Method and modular system for generating, capturing and re-displaying SDI video signals. When generating a video signal, data blocks are arranged in a line parameter memory, each corresponding to a complete video line and containing pointers to specific entries for lines of the video signal in a primary image memory holding a main bit-mapped image, and a video line construct memory holding data enable and blanking patterns before being serialized into a output data stream. On the capture side, a de-serializer/equalizer accepts an input data stream extracts Y (luminance), $C_B$ (blue-difference chroma) and $C_R$ (red-difference chroma) data along with clock/sync information which can be used for re-display. Optional support of HDMI, DVI and analog formats, such as composite video, raster video and stroke video, allows a single instrument to generate, acquire and process virtually all known video interfaces, using standard or custom image/formats.

36 Claims, 10 Drawing Sheets

SDI ACQUISITION HIERARCHY

(58) Field of Classification Search
CPC ........... H04N 21/2343; H04N 21/2385; H04N 21/2365; H04N 21/4347; H04N 21/4305; H04N 5/46; H04N 9/64
USPC ............... 348/181, 180, 189, 469, 720, 558; 345/520, 629, 16; 341/60, 61, 99, 100; 370/366, 368, 503, 509, 514, 536, 370/381–383, 542; 375/240, 240.26, 375/240.28
See application file for complete search history.

(56) References Cited

U.S. PATENT DOCUMENTS

| | | |
|---|---|---|
| 7,180,477 B2 | 2/2007 | Howell |
| 7,253,792 B2 | 8/2007 | Biagiotti et al. |
| 7,289,159 B1 | 10/2007 | Biagiotti et al. |
| 7,495,674 B2 | 2/2009 | Biagiotti et al. |
| 7,768,533 B2 | 8/2010 | Biagiotti et al. |
| 7,839,932 B2 | 11/2010 | Kuppens et al. |
| 7,978,218 B2 | 7/2011 | Biagiotti et al. |
| 8,615,783 B2 | 12/2013 | Dachiku |
| 8,648,869 B1 | 2/2014 | Biagiotti et al. |
| 8,760,583 B1* | 6/2014 | Lee .................. H04N 21/42638 348/558 |
| 8,788,228 B1 | 7/2014 | Biagiotti et al. |
| 8,817,109 B1 | 8/2014 | Biagiotti et al. |
| 8,817,110 B1 | 8/2014 | Biagiotti et al. |
| 8,860,759 B1 | 10/2014 | Biagiotti et al. |
| 8,913,196 B2 | 12/2014 | Hamamura |
| 2012/0019668 A1* | 1/2012 | Seth-Smith .......... H04N 17/004 348/181 |

* cited by examiner

GENERAL ARRANGEMENT

SDI BLOCK DIAGRAM

SDI MEMORY HIERARCHY

FRAME CREATION MEMORY ADDRESS COUNTER

DYNAMIC OVERLAY

SDI GENERATION $$\begin{bmatrix} Y \\ C_B \\ C_R \end{bmatrix} = \begin{bmatrix} 16 \\ 128 \\ 128 \end{bmatrix} + \begin{bmatrix} 0.257 & 0.504 & 0.098 \\ -0.148 & -0.291 & 0.439 \\ 0.439 & -0.368 & -0.071 \end{bmatrix} \cdot \begin{bmatrix} R \\ G \\ B \end{bmatrix}$$

RGB to $YC_BC_R$ color conversion for SDTV where:
R/G/B [0...255]
Y [16...235]
$C_B/C_R$ [16...240]

$$\begin{bmatrix} Y \\ C_B \\ C_R \end{bmatrix} = \begin{bmatrix} 16 \\ 128 \\ 128 \end{bmatrix} + \begin{bmatrix} 0.183 & 0.614 & 0.062 \\ -0.101 & -0.338 & 0.439 \\ 0.439 & -0.399 & -0.040 \end{bmatrix} \cdot \begin{bmatrix} R \\ G \\ B \end{bmatrix}$$

RGB to $YC_BC_R$ color conversion for HDTV where:
R/G/B [0...255]
Y [16...235]
$C_B/C_R$ [16...240]

*FIG. 6A*
RGB to $YC_BC_R$
EQUATION MATRIX

SDI ACQUISITION HIERARCHY

GENERAL ARRANGEMENT

VIDEO PROCESSOR WITH DIGITAL VIDEO SIGNAL PROCESSING CAPABILITIES

FIELD OF THE INVENTION

The present invention relates generally to the field of automatic test equipment for evaluating serial digital interface (SDI) video electronic signals that are utilized by equipment under test by the automatic test system. More specifically, the present invention relates to SDI video signal generation and SDI video signal acquisition, both arrangements and method for performing such signal generation and signal acquisition.

BACKGROUND OF THE INVENTION

Automatic test equipment for testing standard format video devices is known. It is commonly required to evaluate the performance and functionality of a video unit under test (UUT) to determine if the UUT is operating within the manufacturer's specifications, and/or within other desired specifications. Certain UUTs may require non-standard or special image/formats.

SDI is a family of digital video interfaces first standardized by SMPTE (The Society of Motion Picture and Television Engineers) in the late 1980s. SDI video signals can be generated by a wide variety of single purpose instruments employing diverse methods. In most available types, the image format and timing are limited to a common set of known standards that primarily support commercial display devices. Similarly, single purpose instruments are available for the acquisition of SDI video signals. Newer UUTs may implement a plurality of digital formats that operate concurrently, necessitating test equipment that supports coherent HDMI, DVI and/or SDI video signals and/or legacy analog video signals. Other UUT applications may be sensitive to latency introduced by external adapters used to translate between different standards resulting in excess jitter or dropout.

Inventions disclosed herein implement a novel adaptation to permit user definable scan/image formats for testing not only SDI video based devices but other complex analog/digital variants as well.

OBJECTS AND SUMMARY OF THE INVENTION

It is an object of at least one embodiment of the present invention to provide a new and/or improved system having coaxial SDI video generating and processing capabilities on a single instrument or single card, primarily intended for use in automatic test equipment, and methods for using such capabilities. Alternate embodiments of the invention may include optical SDI interfaces, in lieu of, or in addition to the coaxial SDI interfaces.

It is yet another object of at least one embodiment of the present invention to generate and format a video picture stream in which two chroma components ($C_B$—blue difference chroma; and, $C_R$—red difference chroma) are typically sampled at half the rate of luma (Y) component. Other embodiments of the invention may operate at other downsampling rates of the luma/chroma or avoid downsampling of the luma/chroma altogether. Three (3) standard red (R), green (G) and blue (B) memories along with equation coefficients are fed into a $YC_BC_R$ equation matrix using multiplexers to produce a 20-bit (10-bit luma+10-bit chroma) stream that is serialized before final output. The multiplexers allow for standard definition (SD), high definition (HD) and user coefficients as well as a mode using reference RGB data for test purposes.

It is yet another object of at least one embodiment of the present invention to provide one or more of these capabilities in either a standalone configuration or in unison with a full-featured video generation and acquisition instrument, such as the Advanced Testing Technologies Inc.'s (ATTI) Enhanced Programmable Video Generator and Analyzer (hereinafter referred to as "ePVGA"), which is a type disclosed, for example, in ATTI's earlier patents which include U.S. Pat. Nos. 6,396,536, 7,180,477, 7,253,792, 7,289,159, 7,495,674, 7,768,533, 7,978,218 (RE45,960), 8,648,869, 8,817,109, 8,817,110 and 8,860,759, all of which are incorporated by reference herein. As described, the ePVGA comprises multiple electronic modules integrated into a single instrument supporting the generation, acquisition and processing of composite video, raster video and stroke video and all of their analog variants.

The SDI video disclosed herein implements HDMI and DVI video and all of their digital variants so as to be supported by the ePVGA. This invention, a novel modification to this concept, leverages the complex circuit architecture already present in the instrumentation disclosed in '536, '159 and '109 patents and adds, in a non-obvious manner, the relevant functionality of SDI video generation and acquisition in a daughterboard configuration. Due to modular design, this invention may also be packaged and operated as a standalone independent SDI test instrument.

A method for capturing and automatically formatting SDI video signals in accordance with the invention includes de-serializing the input data stream into two 10-bit luma (Y) and chroma (interleaved $C_B/C_R$) signals, clock, vertical/horizontal sync, enable and sync detect control signals. The de-serialized signals feed a single real-time acquisition module including at least three input channels for receiving the SDI video signals, and a corresponding number of color-specific memories, detecting presence of a SDI signal by using a vertical sync pulse to trigger a timed pulse indicative of vertical sync presence, storing captured SDI data relating to the video signals in separate color-specific memories, and automatically measuring parameters of the serial digital interface signal including, but not limited to: duration of an active image area on a video line, a total pixels per line, a total line time, a frame time, and a pixel clock frequency. In instances where the video signal is interlaced, these parameters may optionally include even/odd field metrics as well. These parameters are directed into data registers to enable retrieval and subsequent formatting of the video signals. Controlling software is then able to generate video signals from the data in the registers and color-specific memories.

One embodiment of a video processing arrangement in accordance with the invention includes a host system including a monitor, a video asset coupled to the host system, for generating video signals, and an interface for connecting the video asset to the host system to enable display of the video signals on the monitor. The video asset includes a plurality of primary elements including, but not limited to, a primary composite video module for producing different types of a primary video signal and outputting the primary video signal via one or more output channels, a secondary composite video source module (e.g., raster module) for producing a secondary composite video signal and outputting the secondary composite video signal via one or more output channels, an SDI module for producing different types of SDI video signals and outputting the SDI video signals via one or more output channels, a stroke generator module for generating a stroke XYZ video signal and outputting the stroke video signal via output channels, one or more real time capture modules for capturing video signals in a plurality of different modes including composite, stroke, raster and SDI video, and a common distributed time base module for generating and distributing clock signals to all of the primary elements that required a clock signal. The primary elements are preferably autonomous or autonomously operational such that each primary element does not share components with other of the primary elements aside from the interface and the distributed time base module to thereby enable each primary element to act as a stand-alone instrument and all of the primary elements to act simultaneously.

The video asset may be a single instrument adapted for insertion into a single slot of the host system. The real time capture module may be configured to read back a captured, fully formatted image for analysis or redisplay. The video asset may include a serial bus interface for connecting each primary element together and to the interface. The real time SDI video acquisition module and the SDI video generation module may physically exist within the same instrument, or in the alternative, physically exist within separate instruments that are utilized together, and, when utilized together, constitute the same functionality as the single instrument with both modules. The SDI video acquisition module and SDI video generation module may be configured on a daughterboard attached to the main video asset, incorporated as part of the main video asset or arranged as a separate independent instrument.

An arrangement for generating serial digital interface (SDI) video signals in accordance with the invention includes a primary image memory (PIM) module that operatively holds a main bit-mapped image, a static (DHV) memory module that operatively holds information regarding the video format being generated, such as data enable and horizontal and vertical sync signal patterns for all lines in the video format being generated, and a dynamic overlay memory (DOM) module that operatively holds at least one overlay image and a list of offsets that determine a changing location of the overlay image on a frame by frame basis. The DOM module has a memory space divided into a series of blocks, each of which contains a bit-mapped image. The arrangement also includes a vector store memory (VSM) module that operatively holds information regarding the overlay image, such as offsets, overlay pointer and priority for the overlay image, a line parameter memory (LPM) module organized as a preferably circular queue of data blocks, each of which corresponds to a complete video line and contains pointers to row entries in the PIM and DHV modules, and a master frame controller coupled to the PIM module, the DOM module, the DHV module, the VSM module and the LPM module. A video stream assembler is also provided and creates a frame of video line by, for example, extracting pointers from the data blocks in the LPM module for the current line, retrieving data from the PIM and DHV modules based on the pointers extracted from the LPM module, extracting pointers for an overlay image from the VSM module, and retrieving data from the DOM module based on the pointers extracted from the VSM module.

BRIEF DESCRIPTION OF THE DRAWINGS

Additional objects of the invention will be apparent from the following description of the preferred embodiment thereof taken in conjunction with the accompanying non-limiting drawings, in which:

FIG. 6A details the R-G-B to $YC_BC_R$ color space equation matrix coefficients as presented in FIG. 6;

DETAILED DESCRIPTION OF THE INVENTION

Figure 1:
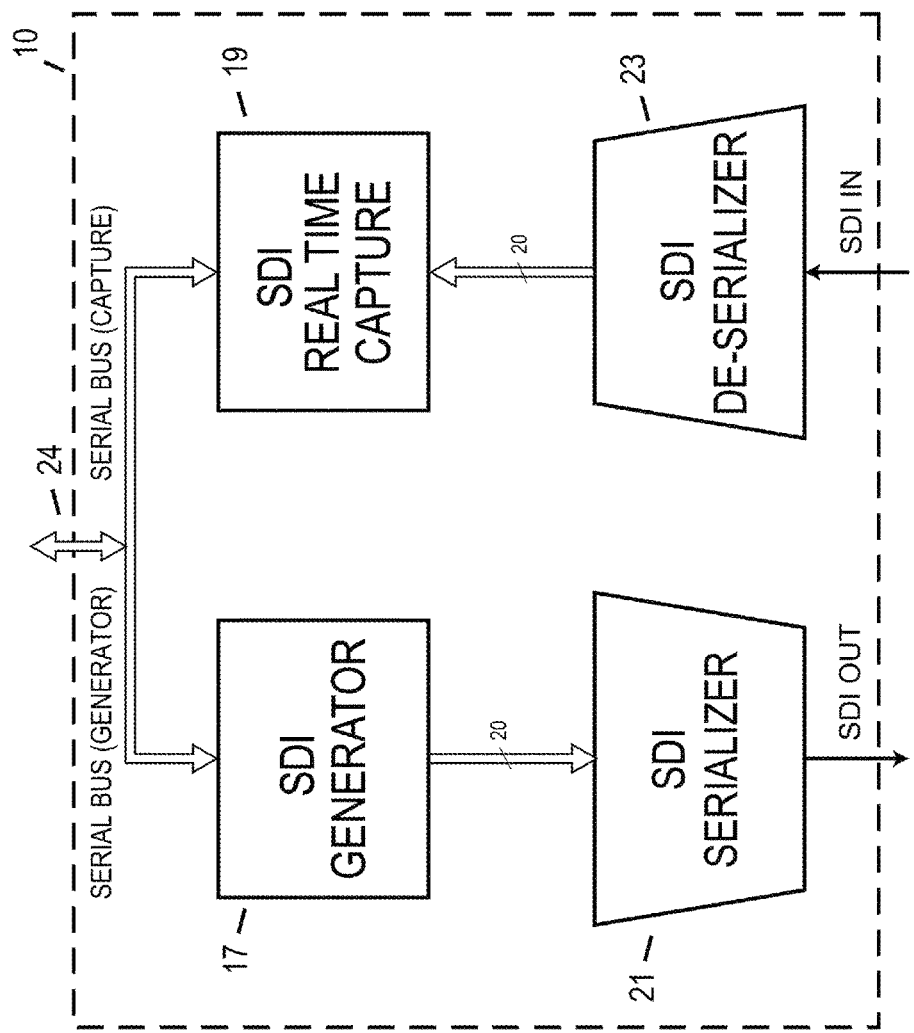
FIG. 1 shows an exemplifying general arrangement of an SDI video generation element and an SDI video acquisition element in accordance with the invention.

A Video Asset (VA) is disclosed and is an electronic instrument for use in particular, but not limited to, in automatic test equipment. One embodiment of the VA comprises or consists of two major elements as follows: SDI Video Signal Generator; and SDI Video Signal Acquisition Module. Additional, optional elements may also be present. This constitutes the digital video signal capability of the video asset or video processor, but additional video processing componentry may be included in the video asset and video processor, typically for video signals other than digital signals as disclosed in earlier patent disclosures by the current assignee, some of which are mentioned herein and incorporated by reference. Preferred embodiments of the invention will be described with reference to FIGS. 1-9 wherein like reference numerals refer to the same or similar elements.

An exemplifying general arrangement of the video asset is shown in FIG. 1 and is designated generally as 10. All communication involving the video asset 10 is implemented via a serial bus interface 24. The serial bus interface 24 facilitates communication between a controlling module (external to this illustrated embodiment, and not shown) and each of a plurality of primary elements that include a SDI generator 17, a SDI serializer 21 coupled to and receiving signals from the SDI generator 17, a SDI Real Time Capture or acquisition module 19 and a SDI de-serializer/equalizer 23 that is coupled to and provides signals to the SDI Real Time Capture module 19. SDI de-serializer/equalizer 23 is often referred to simply as the de-serializer herein. Thus, there can be direct communications between the controlling module and each of the SDI generator 17, the SDI serializer 21, the SDI Real Time Capture module 19 and the SDI de-serializer 23. From the SDI serializer 21, the SDI OUT signal is directed via a conventional signal transmission component, and the SDI IN signal is provided to the SDI de-serializer 23 via another conventional signal transmission component.

The conventional signal transmission component may be configured to provide a signal to a display device, or as accessory thereto, to enable the output SDI signals to be used by the display device to display a video created from the output SDI signals. Generally, the conventional signal transmission component will be considered an example of, or part of, a signal application device which applies the signal to eventually enable creation of a video for viewing derived from the signal.

Video asset 10 may be configured as a standalone independent SDI test instrument. Thus, it may be configured on a printed circuit board and include the components shown in FIG. 1. Necessary connectors and other electrical hardware needed to implement the functionality of the primary elements 17, 19, 21 and 23 would be readily apparent to one skilled in the art and are not shown. Also, the construction of the primary elements 17, 19, 21 and 23 would be readily known to those skilled in the art and are not described in detail. Several elements within the SDI generator/acquisition instrument may share common components with other analog/digital video standards. Various different constructions of these primary elements are available and the invention is not limited to any particular construction of a primary element.

Use of the serial bus interface 24 reduces printed circuit board complexity and minimizes the possibilities for hostile crosstalk. For the described, preferred embodiment, the serial bus interface 24 is a six wire high-speed bus (clock, strobe, four bi-directional data bits). For each data transfer, the serial bus interface 24 preferably utilizes a 48-bit string organized as follows:
- 4 bit ID code—addresses one of the primary elements
- 8 bit Header—establishes type of transfer within the addressed primary element; read or write to a register, read or write to a specific asynchronous RAM, read or write to a specific synchronous RAM, or read or write to a specific dynamic RAM.
- 20 bit Address—points to a specific register, or is physical address for the specified RAM
- 16 bit Data—read or write data to the above addressed memory element FIGS. 2-6 show a general arrangement of an exemplifying embodiment of the SDI generator 17 in accordance with the invention. At the core of the SDI generator 17 is a series of memories that hold the various components of the SDI video signal and all required ancillary signals. These memory components include:
- Primary Image Memory (PIM) module 28—a high density memory which holds the main bit-mapped image. In a preferred embodiment, the PIM module 28 is organized so that a video line corresponds to a half row in memory with each entry in the PIM representing two pixels.
- Dynamic Overlay Memory (DOM) module 30—a high density memory which holds at least one and preferably a series of overlay images and a list of offsets that determine the changing location of the overlay image on a frame by frame basis. The DOM module's memory space is divided into a series of blocks, i.e., a plurality of blocks, each of which contains a bit-mapped image. More generally, the DOM module 30 holds information regarding the overlay image necessary to enable its generation.
- DHV Memory module 32—a medium density static memory which holds the data enable and horizontal and vertical sync signal patterns for all of the lines in the video format being generated. The RAM DHV memory module 32 is preferably organized as a series of rows, each of which holds sync and data enable signals for a complete video line. More generally, the DHV memory module 32 holds information regarding the video format being generated. (DHV refers to data enable/H sync/V sync.)
- Vector Store Memory (VSM) module 34—a medium density static memory that holds the offsets, overlay pointer and priority for the overlay that is active, for the current frame.

Test set-ups that implement SDI adapters or converters to achieve this same functionality introduce additional skew relative to other native formats. Since these core memories are used to manipulate the PIM/DOM images, having direct access to this data across multiple analog and digital formats allows video asset 10 to provide not only coherent analog and digital outputs simultaneously but also with minimal latency.

Figure 3:
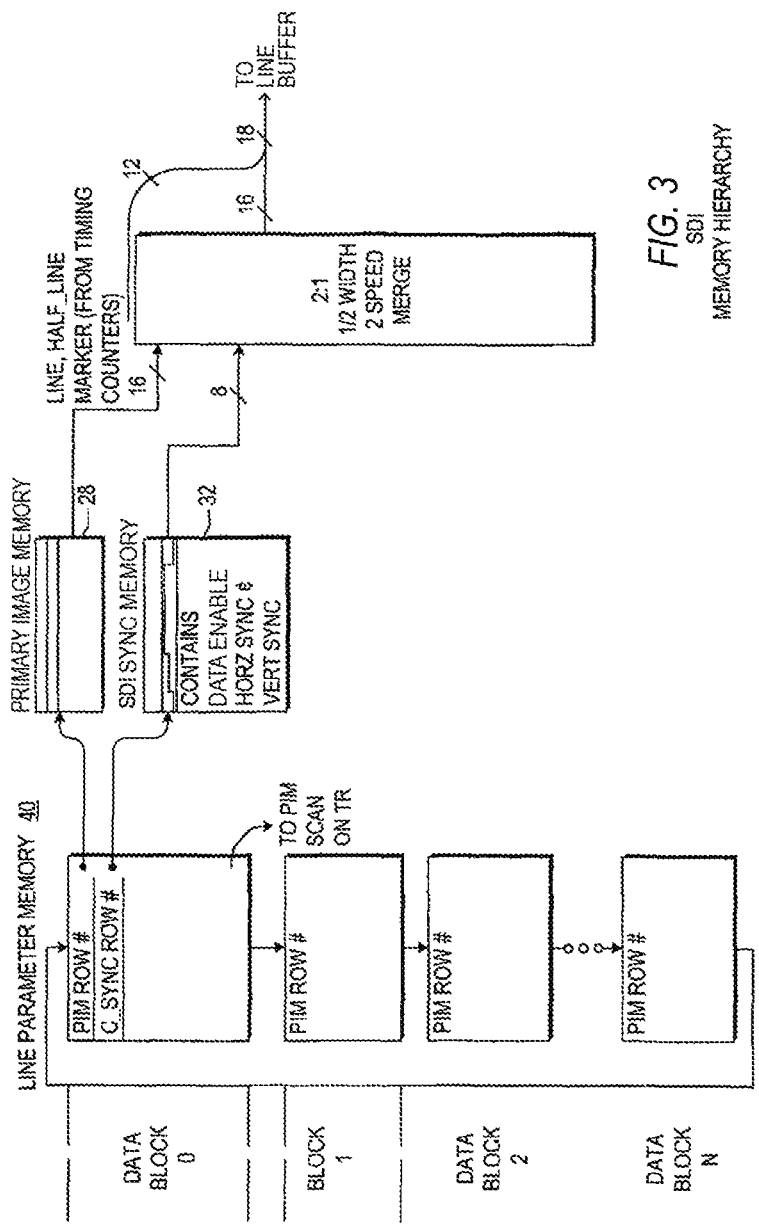
FIG. 3 shows a memory hierarchy of an SDI video generation element of the video asset in accordance with the invention.

Another static memory, the Line Parameter Memory (LPM) module 40 is located one step up in the conceptual control hierarchy as shown in FIG. 3. This memory module 40 is organized as a circular queue of data blocks (see data block 0, block 1, data block 2, data block N in FIG. 3), each of which corresponds to a complete video line. Each data block contains pointers (PIM ROW#, C_SYNC ROW #) to the respective row entries in the PIM module 28 and DHV memory module 32 (see FIG. 3). This control structure is very flexible in that the components of the video signal are defined line by line.

A master frame controller or DOM controller 26 is coupled to the VSM module 34, receiving and providing signals thereto, described below. The DOM controller 26 is also coupled to the LPM module 40 receiving and providing signals thereto, described below. The DOM controller 26 is also coupled to the PIM and DOM modules 28, 30 and provides signals thereto, described below. Finally, the DOM controller 26 is coupled to the DHV memory module 32 directly and also through a register 36.

A frame of video is created line by line. In a preferred embodiment, for each line, the SDI generator 17 reads the LPM module 40 and extracts the pointers from the data block for the current line. This takes place during the time after the previous line has finished and before the current line begins (for lines other than the initial line). The extracted pointers determine which row is active in each of the memories. The overall timing of the line is controlled by four counters 42, 44, 46, 48—see FIG. 4 for a block diagram. A line length counter 42 determines the total length of the line, and receives data from a line length pre load data register 41. A video delay counter 44 determines when the active video begins in a line, and receives data from a video delay pre load data register 43. Note the video delay counter supports zero delay.

Figure 4:
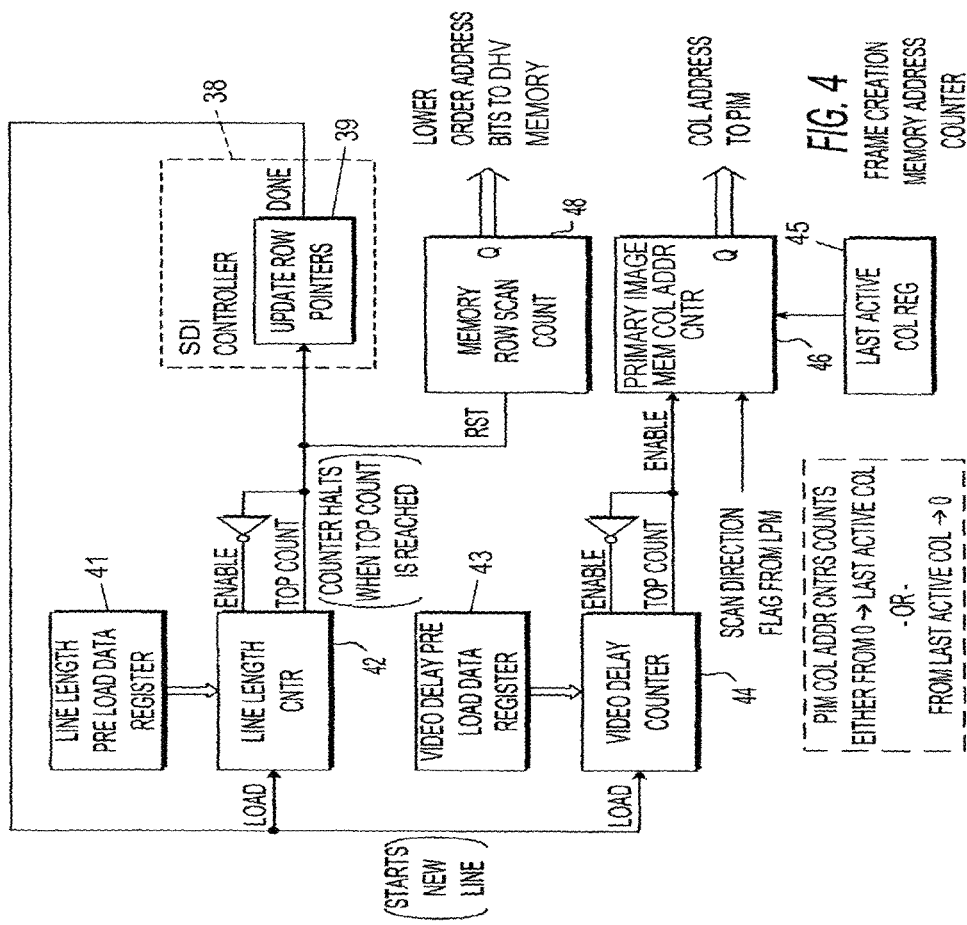
FIG. 4 is a block diagram of the manner in which a new line is created in the Video Signal Generator.

The PIM (primary image memory) column counter 46 determines which column is to be read from the PIM module 28 (see column address to PIM output in FIG. 4). A scan direction flag from the LPM module 40 is provided to the PIM column counter 46. The PIM column counter 46 receives an enable signal from the video delay counter 44 and data from a last active column register 45. A static memory row scan counter 48 provides the lower order address for the DHV memory module 32 (see lower order address bits to DHV memory output in FIG. 4).

By convention, a video line begins with the leading edge of the horizontal sync pulse. At the beginning of the line, the line length, video delay and the static memory scan counters 42, 44, 48 start (see "starts new line" and "load" indicators in FIG. 4 originating from the update row pointer 39 of the SDI controller 38). When the video delay counter 44 reaches terminal count, the PIM column counter 46 starts. The PIM column counters 46 counts from zero up to maximum value which has been programmed by the user and represents the active pixels per line.

As the memories are scanned, a 32 bit wide data stream is produced—16 bits from the PIM module 28 (2 pixels), and 8 bits from the DHV memory module 32. The data stream is then converted into a 16 bit wide stream at twice the clock rate at which the memories were read (see FIG. 3, 2:1 ½ width 2 speed merge). Each entry in this stream represents two pixels times of data.

Figure 2:
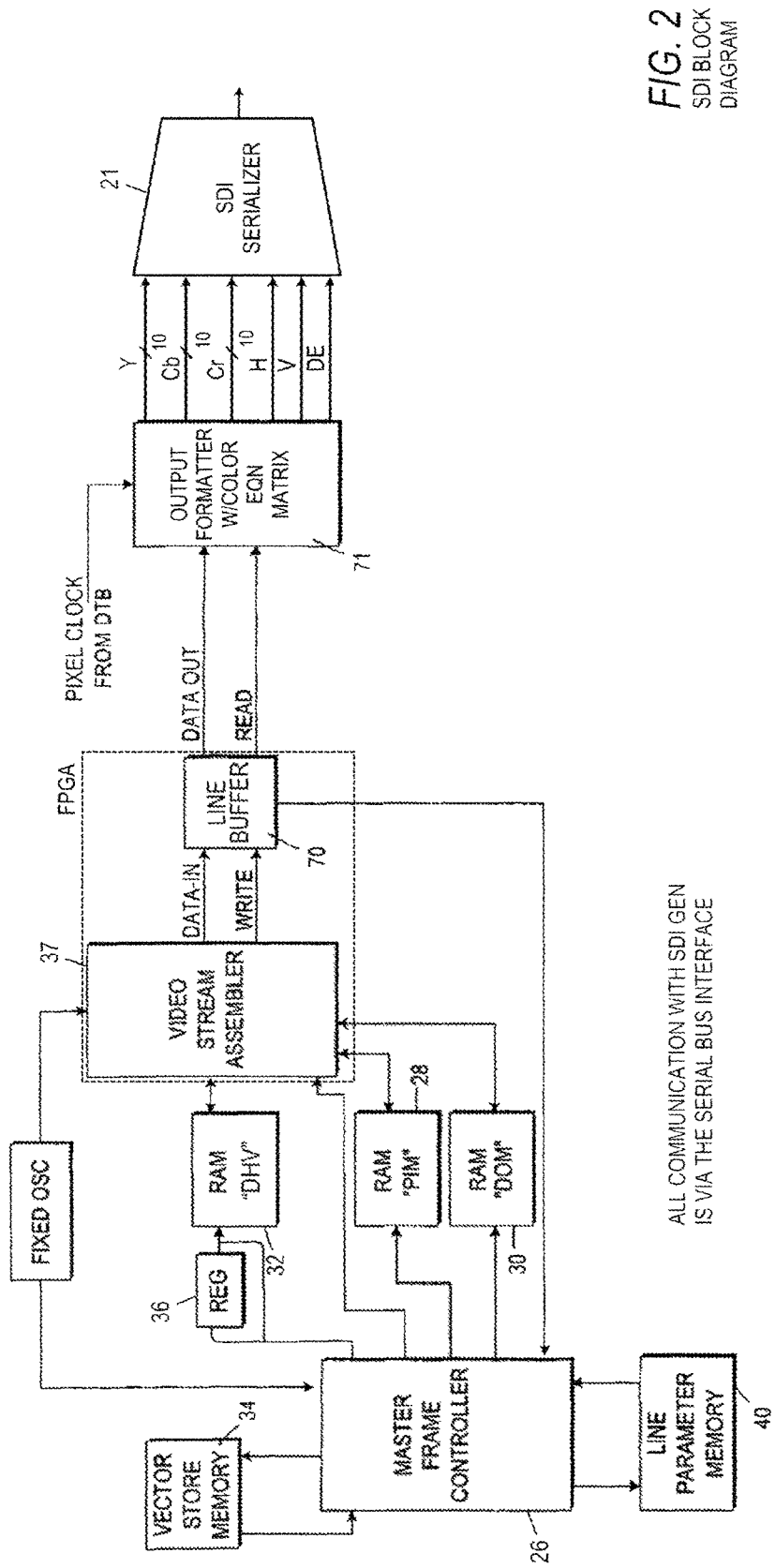
FIG. 2 shows an overall hierarchy of an SDI video generation element of the video asset in accordance with the invention.

These functions occur in a video stream assembler 37 coupled for signal transmission with the master frame controller 26, the DHV memory module 32, the PIM module 28 and the DOM module 30, see FIG. 2. Video stream assembler 37 receives a clock signal from a fixed oscillator, and data from the PIM module 28, DOM module 30, DHV memory module 32 and master frame (DOM) controller 26. The fixed oscillator also provides a clock signal to the master frame (DOM) controller 26. From the received data, the video stream assembler 37 provides data-in and write information to the line buffer memory 70 which feeds back to the master frame (DOM) controller 26.

Lastly, the data is written into the line buffer memory 70 that separates the non-real time portion from the real time portion (see FIG. 2). Note that with this control structure, scan formats such as interlaced and non-interlaced, are established entirely by the order of the PIM row pointers. Additionally, since a pointer to the DHV memory module 32 is in each data block, any DHV line pattern can be associated with any line of image.

An output formatter 71 coupled to the line buffer memory 70 takes the image stream from the line buffer memory 70 (via Data-out and Read lines); receives a pixel clock from the distributed time base (DTB) 27 (see FIG. 8), calculates the R-G-B byte representation for each pixel as shown. A $YC_BC_R$ equation matrix 53 transforms the R-G-B data into Y, $C_B$ and $C_R$ data, and, when DE is active low; constructs the horizontal sync (H), vertical sync (V) and data enable (DE) signals for the present video line which feeds those signals into the final stage, SDI serializer 21 (represented by the channels or lines between the output formatter 71 and the SDI serializer 21). The output formatter 71 includes three multiplexers, one for each color. The SDI serializer 21 is responsible for converting the supplied video signals for external transmission. Thus, eight discrete output channels of each color are preferably provided.

The video asset 10 has the capability and functionality to, among other things, superimpose a dynamic image over the primary, static image. The dynamic overlay images, one or more of which may be superimposed over each primary, static image, and their associated list of offsets are stored in the DOM module 30. For each overlay image in the DOM module 30, a memory space, or template, is allocated. The template size is specified as 'V' lines by 'H' pixels. Activation and merging of the overlay image is accomplished by the DOM controller 26.

Referring again to FIG. 2, during the line update interval, the DOM controller 26 reads the next offset entry from the Vector Store Memory (VSM) module 34. Each entry in the VSM module 34 holds four data items; line offset loaded into register 64, pixel offset loaded into register 66, overlay image pointer loaded into register 68, and priority (see FIG. 5). A controller 62 (represented by the components in the dotted line box) compares the overlay line offset to the pending line of the primary image. If the pending primary image line falls between the line offset and the line offset plus the template line size, i.e., overlay line offset<=pending primary line<=overlay line offset+'V', then the overlay image will be active during the pending line. If not, the overlay image will not be active during the pending line and no further activity takes place until the next primary line update.

Figure 5:
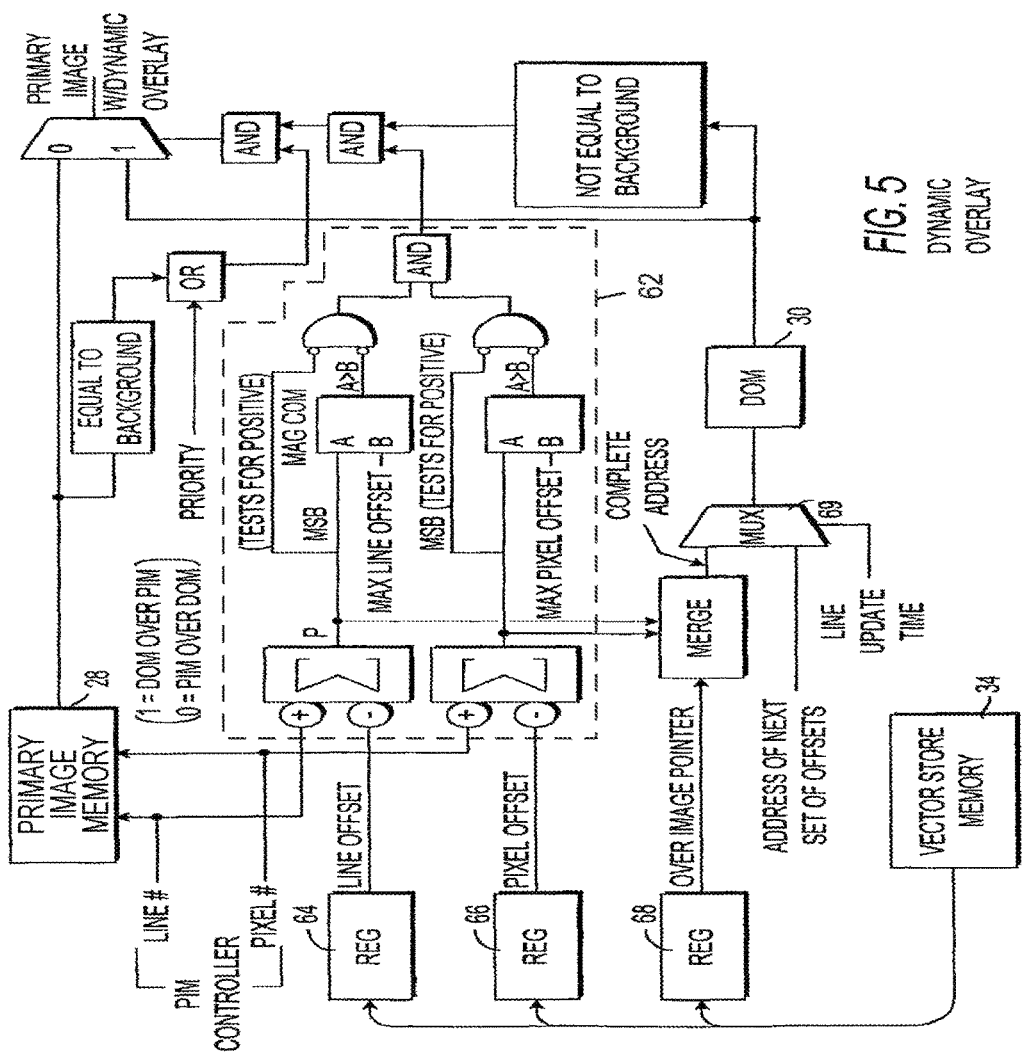
FIG. 5 is a schematic drawing of a dynamic overlay for use in the video asset in accordance with the invention.

There are several different ways to configure the controller 62 to achieve these functions, and the structure shown in FIG. 5 is exemplifying only and not limiting. The different configurations are considered to be part of the invention, along with obvious variations of these configurations.

When the overlay image is active during pending primary line, the overlay image line to be accessed is the primary pending line minus the overlay line offset. During the actual scan of the primary image line, the pixel address is continuously compared with the overlay pixel offset. When the primary pixel address falls on or between the overlay pixel offset and the overlay pixel offset plus 'H', the scan shifts from the primary image to dynamic overlay image. However, if the current overlay image pixel value is the background value and the priority bit is set to DOM over PIM (for example, 1), a hardware mux 69 selects the primary pixel instead of the overlay pixel (see FIG. 5). This makes the background 'color' of the overlay image transparent so that overlay image can be seen over the primary image, but not shape of overlay template.

If the priority bit is set to PIM over DOM (for example, 1), the active pixels of the overlay are selected only during the primary image background color. This puts the overlay image underneath the primary. When scanning the dynamic overlay image line, the overlay pixel address is equal to the primary pixel address minus the overlay pixel offset. This method of the transferring scan from the primary to the overlay memory is independent of the scan direction either vertically or horizontally. To complete the DOM address field when accessing the template stored image, the overlay image pointer loaded into register 68 points to a pair of registers in the controller which contain the template horizontal and vertical offsets within the DOM module 30. These offsets are hardware added to the template line and pixel address to form the complete DOM address. This is also how individual templates are selected.

Figure 6:
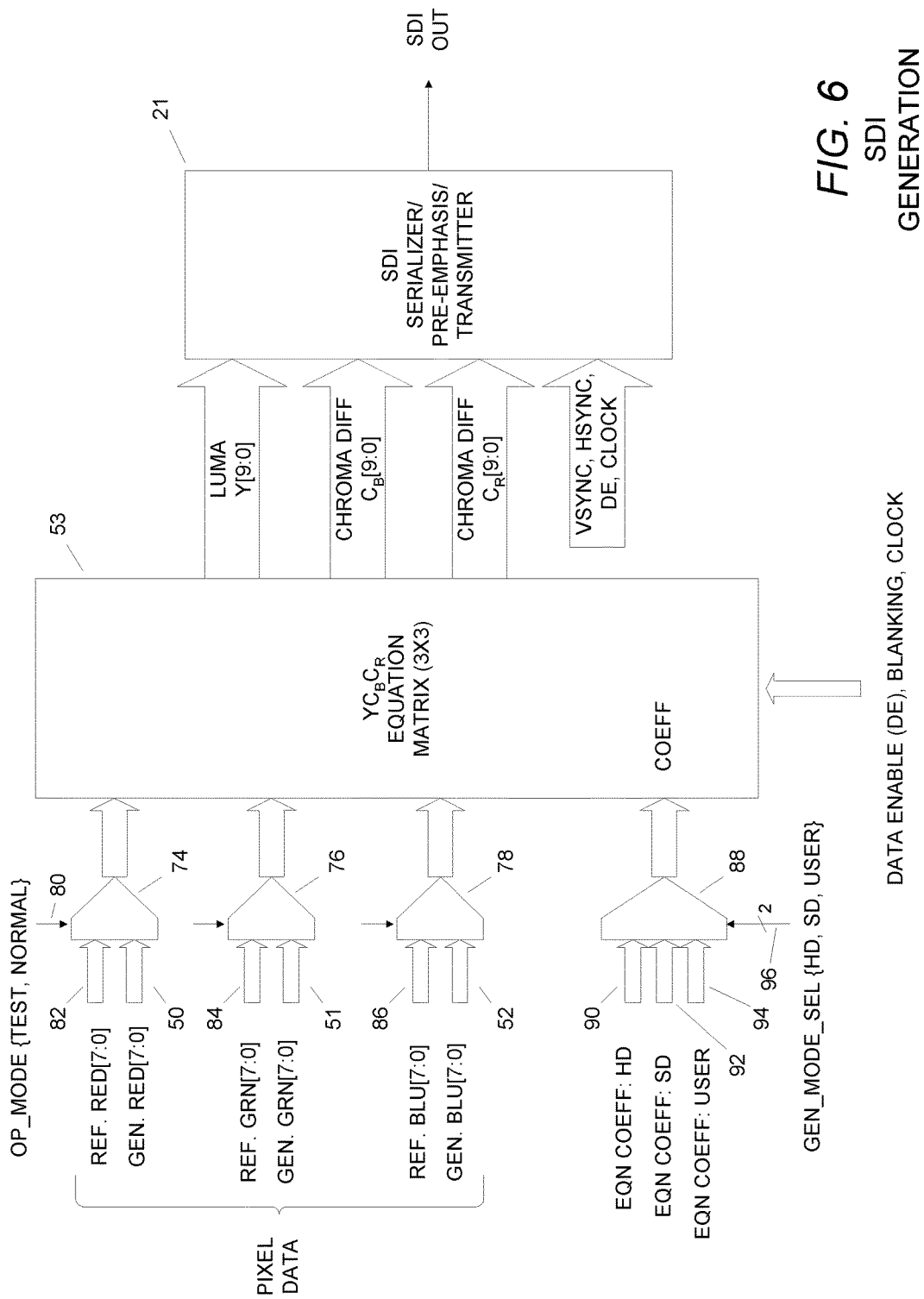
FIG. 6 is a block diagram of a R-G-B to $YC_BC_R$ color space equation matrix for use in the video asset in accordance with the invention.

As depicted in FIG. 6, during normal operation, image store memories 50, 51, 52 representing red, green and blue data pass through respective multiplexers 74, 76, 78 before entering the $YC_BC_R$ equation matrix processing component 53. A reference data set 82, 84, 86 can also pass through multiplexers 74, 76, 78 to act as a test mode. Selection of multiplexer 74, 76, 78 input source is via a control signal 80 that determines its operating mode (normal or test). The SDI luma/chroma data is formatted in a 10-bit wide word; 8-bit wide data can be accommodated by left justifying the 8-bit data within the 10-bit word width and setting the two least significant bytes (LSBs) to zero (0). In the current embodiment, 8-bit image data feeds the equation matrix processing component 53 but in no way is the invention limited to 8-bit operation.

The $YC_BC_R$ equation matrix processing component 53 is also fed with an equation coefficient from multiplexer 88, for use as the "equation matrix". The inputs to multiplexer 88, of which there is a plurality of different inputs, allow a high definition (HD) equation coefficient 90, a standard definition (SD) equation coefficient 92, or a user equation coefficient 94 to pass through multiplexer 88, and to be used as the equation matrix applied by the equation matrix processing component 53. Selection of multiplexer 88 input source is via a two (2) bit control signal 96 that determines which equation coefficient is applied. The $YC_BC_R$ equation matrix processing component 53 applies the selected matrix coefficients of the received equation matrix to the 8-bit image data resulting in a 24-bit product; the 10 most significant bits (MSBs) are fed into the SDI serializer 21 to produce the final SDI OUT signal.

The selected matrix coefficients are the coefficients or elements of the equation coefficient 90, 92, 94 being passed through multiplexer 88. As used herein, the equation coefficient will be considered the entire matrix, e.g., a 3×3 matrix of values that precede the '• [R G B]' column as shown in FIG. 6A, while the individual numbers or values in the equation coefficient will be referred to as matrix coefficients or matrix elements.

The $YC_BC_R$ equation matrix processing component 53 also utilizes enable, blanking and clock signals to produce the 10-bit Y (luminance), $C_B$ (blue-difference chroma) and $C_R$ (red-difference chroma) data streams which are fed into SDI serializer 21. The SDI serializer 21 includes low voltage differential signaling (LVDS) transmitters and may optionally include programmable hardware pre-emphasis. The SDI serializer 21 interleaves Y, $C_B$ and $C_R$ data and DHV (Data enable/H sync/V sync) control signals along with a clock from the distributed time base (DTB) 27 to produce a single SDI encoded bit stream.

The color space equation coefficients 92, 90 used for standard definition television (SDTV) and high definition television (HDTV), respectively, differ slightly and are detailed in FIG. 6A. Full scale 8 bit R-G-B data (allowing values between 0 and 255, inclusive) produce corresponding Y (allowing values between 16 and 235, inclusive), $C_B$ and $C_R$ (allowing values between 16 and 240, inclusive) data sets.

The $YC_BC_R$ values are derived from the RGB values using the matrix equations in FIG. 6A. There are some variations in the headroom of the RGB values (in this case they are full scale 8 bit: 0-255, as noted) as well as the $YC_BC_R$ values as noted. The single column matrix in front [16 128 128] adds a bias or offset to the values that are calculated. Black (R=0, G=0, B=0) results in the single column (Y=16, $C_B$=128, $C_R$=128) whereas white (R=255, G=255, B=255) results in (Y=235, $C_B$=240, $C_R$=240).

The equation matrix processing component 53, also permits a user equation coefficient 94 to be utilized, which includes matrix coefficients determined by the user and downloaded from a source thereof. In this embodiment, the user can download nine 16-bit values for use as matrix coefficients to thereby form the user equation coefficient 94 within the invention to allow for a custom $YC_BC_R$ data set transform as depicted in FIG. 6. The manner in which such values can be stored in a source and obtained from such source is any known download technique known to those skilled in the art to which this invention pertains.

Figure 7:
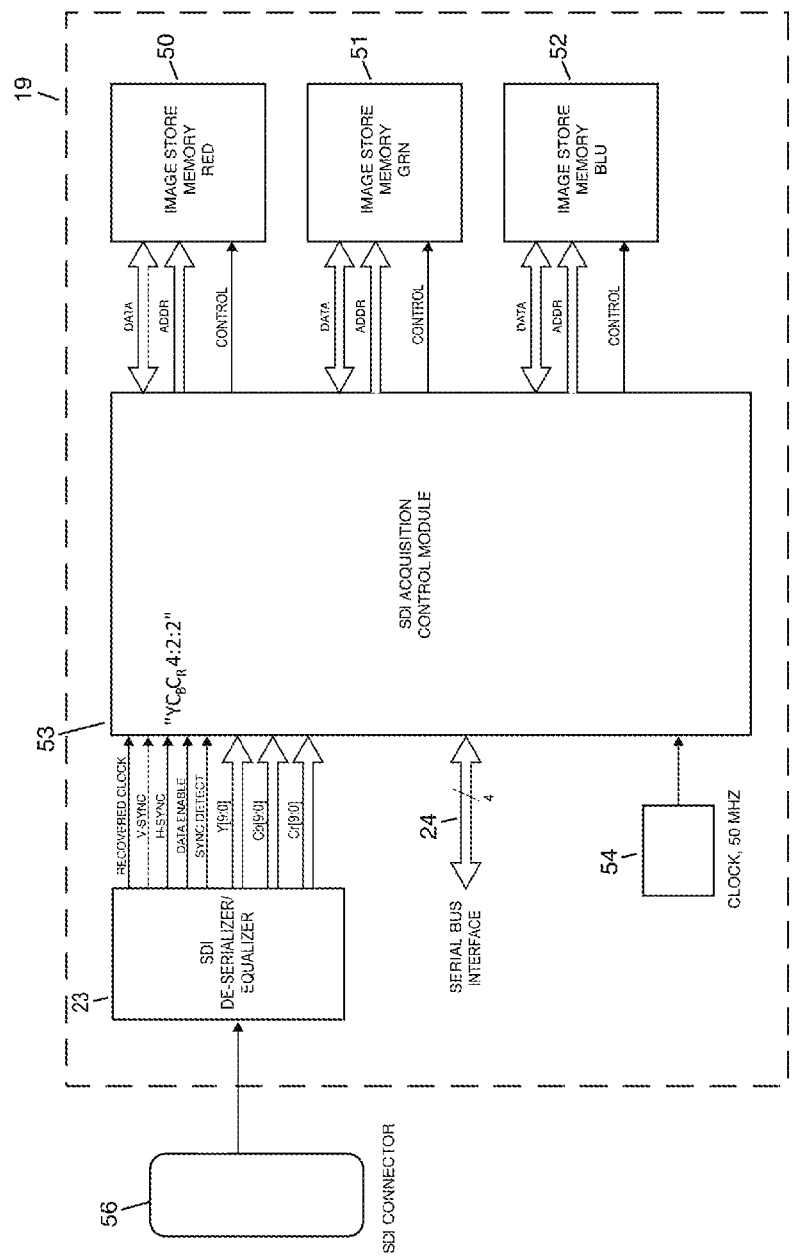
FIG. 7 is a schematic diagram of an SDI video acquisition (real time capture element) for use in the video asset in accordance with the invention.

The general arrangement of the SDI real time capture or acquisition module 19 is shown in FIG. 7. The function of the SDI real time capture module 19 is to perform one-shot full frame video image capture (also referred to as acquisition herein) on any SDI video format independently from the SDI generator 17. Accordingly, to achieve at least one of the objects above, a method for capturing and automatically formatting SDI video signals, in accordance with the invention, comprises providing a single real-time capture module including a SDI de-serializer 23 for accepting one or more SDI video signals, and three memories 50, 51, 52, storing the data from the input channels relating to the video signals in the three memories 50, 51, 52, generating a line location look-up table during the storage of data in the memories 50, 51, 52 which holds the starting address of the stored lines of synchronized video, i.e., the full frame video image. The input channels are the copper (also denoted as coaxial BNC) or optical connections. This is represented by connector 56 in FIG. 7.

Referring now to FIG. 7, with respect to the SDI de-serializer 23 and the equation matrix processing component 53 (also referred to more generally as the SDI Acquisition control module), SDI signals are input to the SDI de-serializer 23 on a connector 56 (coaxial BNC, aka 'copper') and are decoded by the SDI de-serializer 23 into discrete constituent signals, namely, V sync, H sync, Data Enable (DE), Sync Detect, recovered clock, red data, green data and blue data. In an alternate embodiment, SDI connector 56 may be implemented as an optical interface in lieu of, or in addition to the coaxial BNC interface.

The SDI Acquisition control module 53 automatically analyzes the discrete signals by determining the timing parameters of the discrete signals using, for example, internal counters clocked by clock oscillator 54, and then places those values into internal registers for evaluation by controlling software. The V sync triggers a single pulse generator which places its value into a software-accessible register indicating the presence of an active video signal when the register is a logic 'high' level. The SDI Acquisition control module 53 includes a processor or processing unit that performs the functions disclosed herein for the SDI Acquisition control module 53. Among other functions, the SDI Acquisition control module 53 measures parameters of the SDI video signals received by the SDI de-serializer 23 including, but not limited to, duration of an active image area on a video line, a total pixels per line, a total line time, a frame time, and a pixel clock frequency, and even/odd field metrics. The measured parameters are directed into one or more data registers to enable retrieval and subsequent formatting of the video signals based on the data in said data registers. These data registers may be housed within the SDI Acquisition control module 53 and/or coupled thereto via the serial bus interface 24.

Although a single SDI de-serializer 23 is indicated in FIG. 7, there may be a plurality of such de-serializers as necessary. Thus, the arrangement for SDI acquisition in a video processor that forms data that enables generation of a full frame video image at a later time in accordance with the invention may be considered to include at least one SDI de-serializer 23. Similarly, although mention is made of a single SDI connector 56, there may be a plurality of such connectors each providing signals to a single de-serializer, to a respective one of a plurality of de-serializers or to a plurality of de-serializers. Thus, the arrangement for SDI acquisition in a video processor that forms data that enables generation of a full frame video image at a later time in accordance with the invention may be considered to include at least one SDI connector 56. When multiple SDI connectors 56 are provided, they may be different from one another or the same as one another. Difference combinations of SDI connectors 56 are thus possible in some embodiments of the invention.

Clock oscillator 54 may operate at 50 MHz as shown in FIG. 7 or another frequency, which could be readily determined by one skilled in the art in view of the disclosure herein. Other means for providing a clock signal to the SDI Acquisition control module 53 may also be used in the invention without deviating from the scope and spirit thereof, Once triggered for video image acquisition, the SDI Acquisition Control Module 53 waits for the top of the next video frame to occur, as denoted by the V-Sync signal from the SDI de-serializer 23. Once triggered, the SDI Acquisition Control Module 53 stores the red, green and blue data within the respective image store memory 50, 51, 52 and stores the data enable, H Sync and V Sync data in a separate memory, called the Tag Memory (not specifically indicated in FIG. 7 but which may be part of the SDI acquisition control module 53 or a separate component electrically coupled thereto). When subsequent H Syncs are detected by the SDI Acquisition control module 53, or the processor therein, which signify the start of the next video line, the RGB data shared memory pointer is incremented to the start of the next memory block (that is assigned to the next video line) and the process repeats.

The organization of the video lines within the memory facilitates efficient read back by the controlling software by retaining the image format throughout the capture process. Upon detection of the next V sync, the process stops and a status bit indicates to the controlling software that the frame capture is complete. Controlling software is software that is executed to control the components of the arrangement for SDI acquisition in a video processor that forms data that enables generation of a full frame video image at a later time in accordance with the invention. Such software controls the SDI Acquisition control module 53 and its components, e.g., the processor therein, as well as the SDI de-serializer 23 and the data flow control components needed to ensure data flow in the SDI real time capture module 19.

The memory (i.e., RGB image memory) may be configured as an array in which each row corresponds to a single line of synchronized video and each column corresponds to a video sample. The connection of the SDI acquisition control module 53 to the serial bus interface 24 enables data flow from other components directly thereto and therefrom.

Figure 8:
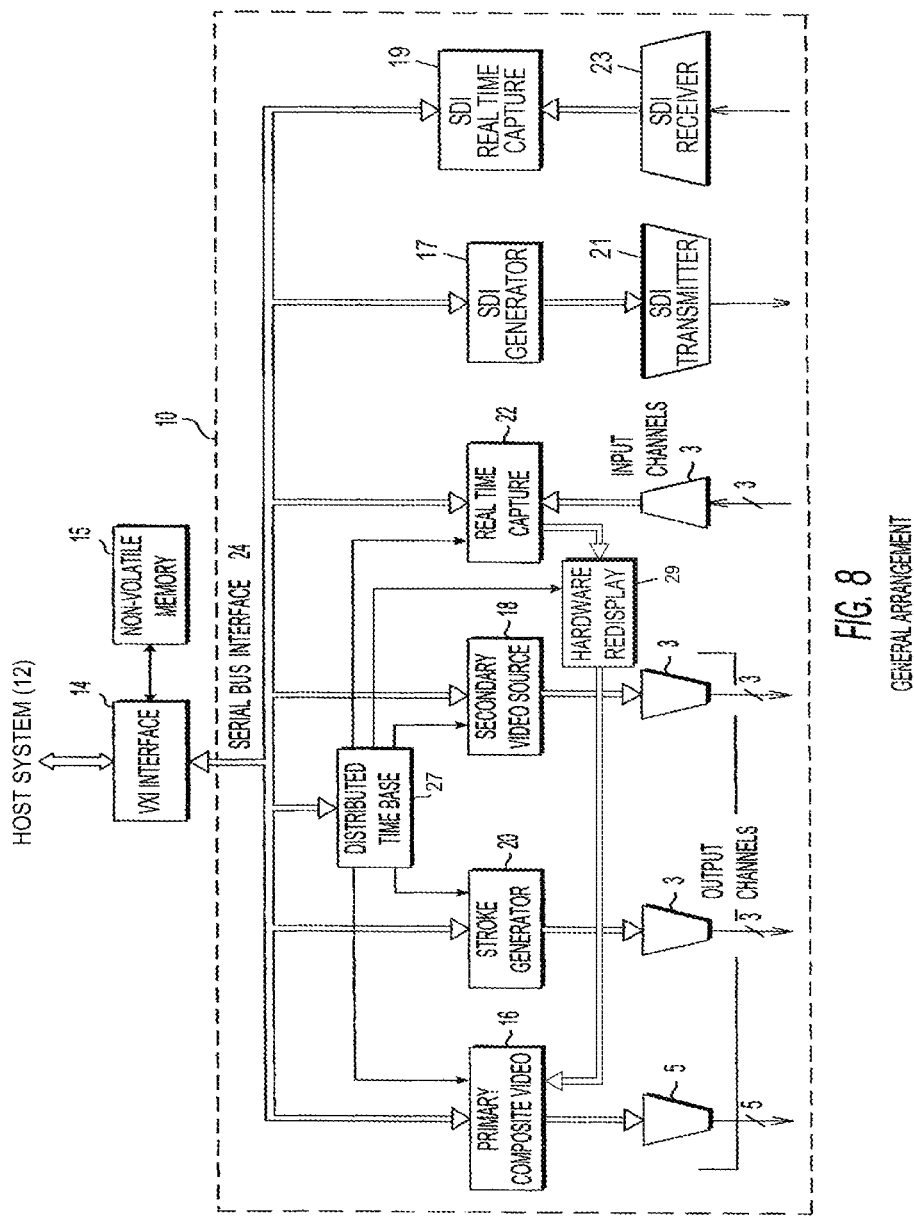
FIG. 8 shows a preferred embodiment of the video asset in accordance with the invention.

Referring now to FIG. 8, with reference to the '536 patent, a video asset (PVGA) 10 comprises several major elements including a primary composite video generator (PVG) 16, stroke generator (SG) 20, secondary video source (SVS) 18, and real time capture (RTC) 22 as part of the video asset 10, see col. 4, lines 5-8. The real time capture module 22 already provides video data acquisition functions and makes the captured data available to external processes for analysis. More specifically, FIG. 8 herein is similar to FIG. 1 of the '536 patent and shows the general arrangement of the video asset which is designated generally as 10. A VXI Interface 14 is the interface between the video asset 10 and an automatic test equipment (ATE) host system 12. Each of the primary elements, the primary composite video generator 16, secondary video source 18, stroke generator 20 and real time capture 22, communicates with the VXI Interface 14 via the serial bus interface 24. The secondary video source may be configured to process raster video signals, and thus a different format than the composite video signals being processed by the primary composite video generator 16.

As to a distributed timebase, clock generation and distribution are the functions of DTB 27. The DTB (27) preferably includes a common high precision crystal oscillator which provides the reference frequency for a series of four high resolution frequency synthesizers individually dedicated to the PVG 16, SVS 18, SG 20 and RTC 22. Non-volatile memory 15 is used to store calculated timing variations for use in processing synchronized video.

The primary composite video generator 16 is configured and programmed to accept the video signal from a redisplay module 29 and, if required by the particular embodiment, perform color space conversion. Additional capabilities and functionality of the redisplay module are set forth in U.S. Pat. No. 8,788,228, which is incorporated by reference herein.

With respect to input/output channels, the video asset 10 has a series of video bandwidth input and output channels. The RTC 22 preferably has three input channels that can handle up to +/−10 volt input. These channels utilize voltage-controlled gain and offset circuits to set the channel's operational parameters. The transfer characteristics of the channels are sensed by means of high-resolution analog to digital converters (ADCs). Precision control digital to analog converters (DACs) provide the necessary control voltages. A software driver resident in the host system 12 reads the sense ADCs, calculates the necessary control voltages and writes them to the control DACs to achieve the desired characteristics. This arrangement permits the channels to be aligned at the time of use to parameters called for in the test program set (TPS) program. Since the channels are accurately aligned at run time, all long-term drift errors are eliminated.

The PVG 16 preferably has three +/−3 volt output channels and two +/−10 volt output channels. The SVS 18 preferably has three +/−3 volt output channels. The SG 20 preferably has three +/−10 volt output channels. (Note: rated voltages are into a 75 ohm load.) All output channels of similar voltage are identical and feature the same sense and control capability as for the input channels. Since all the sense ADCs and control DACs have a serial interface, communication with them is achieved via the serial bus interface 24. The output channels of the PVG 16, the SVS 18 and the SG 20 are discrete, i.e., separate from one another, so that there may be a total of nine output channels.

FIG. 8 also shows the SDI generator 17 and SDI serializer 21 as part of the video asset 10, and SDI real time capture module 19 and SDI de-serializer 23 are coupled to the VXI interface 14 via the serial bus interface 24. While the invention is intended as a fully featured, VXI controlled video asset 10 as shown in FIG. 1, alternate control embodiments of the invention are also possible such as shown in FIG. 8. The declining use of analog video in new product designs may limit the use of the analog portions of the video asset 10 to testing older assemblies. In these circumstances, just the digital video portions (HDMI, DVI, SDI) of the video asset 10 could be bundled into a VXI controlled video asset. Since the VXI standard is considered a mature standard as of 2016, the video asset 10 could be adapted to other newer standards (i.e. PXI) as well.

Figure 9:
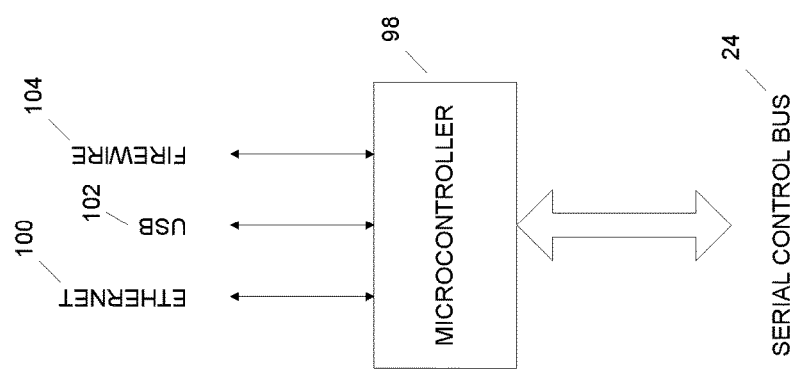
FIG. 9 shows an alternate embodiment arrangement of the video asset in accordance with the invention.

Flexibility of the serial bus interface 24 allows for alternate control embodiments as shown in FIG. 9. A microcontroller (or microprocessor) 98 can be used to translate data from a high speed bus such as, but not limited to: Ethernet 100, USB 102 or Firewire 104 to the six wire high-speed serial bus interface 24 described earlier. This alternate control embodiment could be implemented as a daughter board add-on or directly on the same printed circuit assembly of the video asset 10. A plurality of alternate high speed embodiments may exist within the video asset 10 to provide a high degree of flexibility when it comes to user control.

The SDI video signal processing structure disclosed herein implements HDMI and DVI video, so that an SDI module may be considered herein to constitute structure capable of producing different types of digital video signals and outputting the digital video signals via one or more output channels. The digital signals may be HDMI, DVI and/or SDI signals, in which case, the SDI module is more generally referred to as a digital signal module. The SDI module would include the SDI generator 17, the SDI transmitter or receiver 21, the SDI Real Time Capture or acquisition module 19 and the SDI de-serializer/equalizer 23, as shown in FIG. 8. A real time capture system may be defined as a combination of the real-time capture module 22 and the SDI Real Time Capture or acquisition module 19.

Due to modular design, the video asset 10 may be implemented as a standalone instrument or as a single combined VXI instrument.

The inventions disclosed above may be used with different form factors, including but not limited to, MMS, Eurocard, VERSAbus, VMEbus, VXI, VPX, PCI, PXI and AXIe to name a few (the full terms of these abbreviations are known to those skilled in the art to which this invention pertains). Over time, as existing instrumentation is deemed obsolete by the original equipment manufacturers (OEMs), it is often replaced by a different (or even new) modular form factor which might not be currently implemented within a test station. Adaptation of the invention to such additional form factors is also encompassed with the scope of the invention.

Above, some preferred embodiments of the invention have been described, and it is obvious to a person skilled in the art that numerous modifications can be made to these embodiments within the scope of the inventive idea defined in the accompanying patent claims. As such, the examples provided above are not meant to be exclusive. Many other variations of the present invention would be obvious to those skilled in the art, and are contemplated to be within the scope of the appended claims.

The invention claimed is:

1. A serial digital interface (SDI) acquisition arrangement in a video processor that forms data that enables generation of a full frame video image at a later time, comprising:
   at least one SDI de-serializer that receives SDI video signals and decodes the received SDI video signals into discrete constituent signals; and
   an SDI real-time acquisition module coupled to said at least one SDI de-serializer and that captures and stores a full frame video image in a format that enables its re-creation,
   said SDI acquisition module comprising:
      three memories that each store data relating to a respective one of a plurality of different colors required to enable generation of the full frame video image from stored data; and
      a control module that receives the discrete constituent signals from said at least one SDI de-serializer and determines the data relating to the respective, different colors and directs the determined data for storage in said three memories,
   whereby data in said three memories is accessed by an SDI generator to form discrete constituent signals that are directed to an SDI serializer to be encoded to cause output of SDI video signals.

2. The arrangement of claim 1, further comprising at least one SDI connector coupled to said at least one SDI de-serializer and that is configured to communicate the SDI video signals to said at least one SDI de-serializer.

3. The arrangement of claim 2, wherein said at least one SDI connector comprises a coaxial BNC connector or an optical connector.

4. The arrangement of claim 1, wherein said control module is configured to generate a line location look-up table during storage of data in said three memories which holds a starting address of each stored lines of the full frame video image.

5. The arrangement of claim 1, further comprising a clock oscillator, and wherein said control module is configured to analyze the discrete constituent signals by determining timing parameters of the discrete constituent signals using internal counters clocked by said clock oscillator and then placing the determined timing parameters into internal registers.

6. The arrangement of claim 1, wherein said at least one SDI de-serializer is configured to decode each received SDI video signal into V sync, H sync, data enable (DE), Sync Detect, recovered clock, red data, green data and blue data which thus constitute the discrete constituent signals.

7. The arrangement of claim 6, wherein the V sync triggers a single pulse generator which places its value into a software-accessible register indicating presence of an active video signal when the software-accessible register is a logic 'high' level, said SDI acquisition module being further configured to, once triggered for video image acquisition as a result of the V sync, waits for a top of a following frame of video to occur and then to direct storage of the data relating to the red, green and blue data in said three memories and storage of the data enable, H Sync and V Sync data in a memory in said control module.

8. The arrangement of claim 6, wherein said SDI acquisition module is further configured to, upon detection of a H sync signifying start of a following video line, increment an RGB data shared memory pointer to a start of a following memory block assigned to the following video line, and upon detection of the following V sync, stop and assign a status bit to indicate that frame capture is complete.

9. The arrangement of claim 1, wherein said SDI acquisition module is further configured to organize video lines within said three memories retaining image format, each of said three memories being configured as an array in which each row corresponds to a single line of synchronized video and each column corresponds to a video sample.

10. The arrangement of claim 1, wherein said processor is configured to measure parameters of the SDI video signals received by said at least one SDI de-serializer including duration of an active image area on a video line, a total pixels per line, a total line time, a frame time, and a pixel clock frequency, and even/odd field metrics and direct the measured parameters into data registers to enable retrieval and subsequent formatting of the video signals based on the data in said data registers.

11. A method for reproducing serial digital interface (SDI) video signals, comprising:
   receiving SDI video signals at at least one SDI de-serializer;
   decoding, using the at least one SDI de-serializer, the received SDI video signals into discrete constituent signals;
   determining, based on the discrete constituent signals and using an SDI acquisition control module, data relating to at least three different colors required to enable generation of SDI video signals;
   directing, using the SDI acquisition control module, the determined data for storage into three respective memories that each store data relating to a respective one of the three different colors;
   accessing data in the three memories, using an SDI generator, to form discrete constituent signals; and
   directing the discrete constituent signals formed by the SDI generator to an SDI serializer to be encoded to cause output of SDI video signals, whereby the output SDI video signals are used by a signal application device to cause display of a video created from the output SDI video signals.

12. The method of claim 11, further comprising generating, using the SDI acquisition control module, a line location look-up table during storage of data in the three memories which holds a starting address of each stored lines of the SDI video signals.

13. The method of claim 11, further comprising:
generating, using the SDI acquisition control module, timing parameters of the discrete constituent signals using internal counters clocked by a clock oscillator; and
storing, using the SDI acquisition control module, the determined timing parameters in internal registers.

14. The method of claim 11, further comprising organizing, using the SDI acquisition control module, video lines within the three memories retaining image format, each of the three memories being configured as an array in which each row corresponds to a single line of synchronized video and each column corresponds to a video sample.

15. The method of claim 11, further comprising:
measuring, using the SDI acquisition control module, parameters of the SDI video signals received by the SDI de-serializer including duration of an active image area on a video line, a total pixels per line, a total line time, a frame time, and a pixel clock frequency, and even/odd field metrics; and
directing, using the SDI acquisition control module, the measured parameters into data registers to enable retrieval and subsequent formatting of the video signals based on the data in the data registers.

16. A serial digital interface (SDI) generator in a video processor that forms a full frame video image from stored data and causes display of the formed full frame video image, comprising:
three memories that each store data relating to a respective one of a plurality of different colors required to enable generation of the full frame video image;
a processor that applies one of a plurality of different multi-dimensional matrix coefficients to data obtained from said three memories to thereby obtain multiplied data; and
an SDI serializer that receives multiplied data from said processor and generates a final SDI OUT signal from the received data.

17. The generator of claim 16, further comprising three controllable multiplexers, each of said three multiplexers being associated with a respective one of said three memories, said multiplexers being situated in a signal path between said three memories and said processor.

18. The generator of claim 17, wherein said three multiplexers are configured to receive a reference data set that provides test data for SDI full frame image formation, and to receive a control signal that determines whether the reference data set or data from said three memories is provided as output from said multiplexers.

19. The generator of claim 16, further comprising a matrix coefficient multiplexer that is controlled to provide one of the plurality of different matrix coefficients to said processor, the plurality of different matrix coefficients including a high definition (HD) matrix coefficient, a standard definition (SD) matrix coefficient and a user matrix coefficient.

20. The generator of claim 16, wherein said matrix coefficients are three-by-three and the data is in 8-bit form such that said processor applies one of the plurality of different three-by-three matrix coefficients to data obtained from said three memories to thereby obtain a 24-bit data stream, said processor being configured to direct only a plurality of most significant bits of said 24-bit stream to said SDI serializer to use to form the final SDI OUT signal.

21. The generator of claim 16, wherein said processor is further configured to apply, in addition to one of the plurality of different multi-dimensional matrix coefficients, data enable, blanking and clock signals to data obtained from said three memories to thereby obtain the multiplied data.

22. The generator of claim 16, wherein said SDI serializer is configured to interleave Y, $C_B$ and $C_R$ data and data enable/H sync/V sync control signals along with a clock signal to produce a single SDI encoded bit stream as the SDI OUT signal.

23. The generator of claim 16, wherein one of the plurality of different matrix coefficients is a user matrix coefficient obtained by enabling a user to interact with said processor and download coefficients for said user matrix coefficient.

24. A method for reproducing serial digital interface (SDI) video signals, comprising:
retrieving from each of three memories data relating to a respective one of a plurality of different colors required to enable generation of the SDI video signals;
applying, using a processor of an SDI generator, one of a plurality of different multi-dimensional equation coefficients to data obtained from the three memories to thereby obtain multiplied data dependent on which of the plurality of different equation coefficient is applied;
directing the multiplied data from the SDI generator to an SDI serializer; and
generating, using the SDI serializer, the SDI video signals from the multiplied data,
whereby the generated SDI video signals are used by a signal application device to cause display of a video created from the generated SDI video signals.

25. The method of claim 24, further comprising controlling a multiplexer to provide one of the plurality of different equation coefficients to the processor, the plurality of different equation coefficients including a high definition (HD) equation coefficient, a standard definition (SD) equation coefficient and a user determined equation coefficient.

26. The method of claim 24, wherein the equation coefficients are three-by-three and the data is in 8-bit form such that the processor applies one of the plurality of different three-by-three equation coefficients to data obtained from the three memories to thereby obtain a 24-bit data stream, the step of directing the multiplied data from the SDI generator to an SDI serializer comprising directing, using the processor, only a plurality of most significant bits of the 24-bit stream to the SDI serializer.

27. The method of claim 24, further comprising applying, using the processor, data enable, blanking and clock signals to data obtained from the three memories to thereby obtain the multiplied data.

28. The method of claim 24, wherein one of the plurality of different equation coefficients is a user determined equation coefficient, further comprising deriving the user determined equation coefficient by enabling a user to select and download coefficients for the user determined equation coefficient from a source of coefficient.

29. A video processor, comprising:
a video asset for generating video signals; and
an interface for connecting said video asset to a host system, said video asset comprising:
  a composite video module for producing different types of a composite video signal and outputting the primary video signal via one or more output channels;
  a raster video module for producing different types of a raster video signal and outputting the primary video signal via one or more output channels;
  a digital signal module for producing different types of digital video signals and outputting the digital video signals via one or more output channels;
  a stroke generator module for generating a stroke XYZ video signal and outputting the stroke video signal via output channels;
  a real time capture system for capturing video signals in a plurality of different modes including composite, stroke, raster and digital video;
  a redisplay module for receiving video signals captured by said real time capture module via said interface, processing the received video signals captured by said real time capture module and directing the processed video signals to said composite video module via said interface; and
  a common distributed time base module for generating and distributing clock signals to said composite video module, said raster video module, said stroke generator module, and said redisplay module;
said digital signal module comprising:
  at least one SDI de-serializer that receives SDI video signals and decodes the received SDI video signals into discrete constituent signals; and
  an SDI real-time acquisition module coupled to said at least one SDI de-serializer and that captures and stores a full frame video image in a format that enables its re-creation, said SDI acquisition module comprising three memories that each store data relating to a respective one of a plurality of different colors required to enable generation of the full frame video image from stored data, and a control module that receives the discrete constituent signals from said at least one SDI de-serializer and determines the data relating to the respective, different colors and directs the determined data for storage in said three memories, whereby data in said three memories is accessed by an SDI generator to form discrete constituent signals that are directed to an SDI serializer to be encoded to cause output of SDI video signals.

30. The video processor of claim 29, wherein said video asset is a single combined VXI instrument or a standalone instrument.

31. A video processor, comprising:
  a video asset for generating video signals; and
  an interface for connecting said video asset to a host system,
  said video asset comprising a digital signal module for producing different types of digital video signals and outputting the digital video signals via one or more output channels;
  said digital signal module comprising:
    at least one SDI de-serializer that receives SDI video signals and decodes the received SDI video signals into discrete constituent signals; and
    an SDI real-time acquisition module coupled to said at least one SDI de-serializer and that captures and stores a full frame video image in a format that enables its re-creation, said SDI acquisition module comprising three memories that each store data relating to a respective one of a plurality of different colors required to enable generation of the full frame video image from stored data, and a control module that receives the discrete constituent signals from said at least one SDI de-serializer and determines the data relating to the respective, different colors and directs the determined data for storage in said three memories, whereby data in said three memories is accessed by an SDI generator to form discrete constituent signals that are directed to an SDI serializer to be encoded to cause output of SDI video signals.

32. The video processor of claim 31, wherein said video asset is a single combined VXI instrument or a standalone instrument.

33. The video processor of claim 31, further comprising a coaxial BNC connector connected to said at least one SDI de-serializer and configured to mate with a complementary coaxial BNC connector.

34. The video processor of claim 31, further comprising an optical connector connected to said at least one SDI de-serializer and configured to mate with a complementary optical connector.

35. The video processor of claim 31, wherein said digital signal module is configured to measure parameters of the SDI video signals received by said at least one SDI de-serializer including duration of an active image area on a video line, a total pixels per line, a total line time, a frame time, and a pixel clock frequency, and even/odd field metrics and direct the measured parameters into data registers to enable retrieval and subsequent formatting of the video signals based on the data in said data registers.

36. The video processor of claim 31, wherein said video asset is adapted to a specific one of a plurality of form factors including MMS, Eurocard, VERSAbus, VMEbus, VXI, VPX, PCI, PXI and AXIe.

* * * * *